United States Patent
Blake

[11] Patent Number: 6,044,726
[45] Date of Patent: Apr. 4, 2000

[54] OPTIMUM ROTATIONALLY SYMMETRIC SHELLS FOR FLYWHEEL ROTORS

[75] Inventor: Henry W. Blake, Oak Ridge, Tenn.

[73] Assignee: Lockheed Martin Energy Research Corporation, Oak Ridge, Tenn.

[21] Appl. No.: 08/885,411

[22] Filed: Jun. 30, 1997

[51] Int. Cl.[7] .................................................. F16F 15/30
[52] U.S. Cl. ............................................................ 74/572
[58] Field of Search ................................. 74/572, 573 R, 74/573 F, 574

[56] References Cited

U.S. PATENT DOCUMENTS

| | | | |
|---|---|---|---|
| 3,208,303 | 9/1965 | Durouchoux | 74/572 |
| 4,821,599 | 4/1989 | Medicott | 74/572 |
| 5,387,451 | 2/1995 | Miller | 428/66.2 |
| 5,452,625 | 9/1995 | Nardone et al. | 156/264 |
| 5,562,014 | 10/1996 | Waagepetersen | 74/572 |
| 5,566,588 | 10/1996 | Bakholdin et al. | 74/572 |
| 5,586,471 | 12/1996 | Nardone et al. | 74/572 |
| 5,590,569 | 1/1997 | Nardone et al. | 74/572 |
| 5,628,232 | 5/1997 | Bakholdin et al. | 74/572 |
| 5,816,114 | 10/1998 | Gregoire et al. | 74/574 |

FOREIGN PATENT DOCUMENTS

| | | | |
|---|---|---|---|
| 0030548 | 2/1983 | Japan | 74/572 |

OTHER PUBLICATIONS

Nayler, G.H.F. Dictionary of Mechanical Engineering. Oxford. Butterworthe–Heinemann, 1996. p. 377. TJ9.N281996.

*Primary Examiner*—Charles A Marmor
*Assistant Examiner*—Ankur Parekh
*Attorney, Agent, or Firm*—Hardaway/Mann IP Group

[57] ABSTRACT

A flywheel rim support formed from two shell halves. Each of the shell halves has a disc connected to the central shaft. A first shell element connects to the disc at an interface. A second shell element connects to the first shell element. The second shell element has a plurality of meridional slits. A cylindrical shell element connects to the second shell element. The cylindrical shell element connects to the inner surface of the flywheel rim.

A flywheel rim support having a disc connected an outer diameter of a shaft. Two optimally shaped shell elements connect to the optimally shaped disc at an interface. The interface defines a discontinuity in a meridional slope of said support. A cylindrical shell element connects to the two shell elements. The cylindrical shell element has an outer surface for connecting to the inner surface of the flywheel rim.

A flywheel rim casing includes an annular shell connected to the central shaft. The annular shell connects to the flywheel rim. A composite shell surrounds the shaft, annular shell and flywheel rim.

11 Claims, 7 Drawing Sheets

OPTIMUM ROTATIONALLY SYMMETRIC SHELLS FOR FLYWHEEL ROTORS

STATEMENT AS TO RIGHTS TO INVENTIONS MADE UNDER FEDERALLY-SPONSORED RESEARCH AND DEVELOPMENT

The U.S. Government has rights in this invention pursuant to contract number DE-AC05-84OR21400, between the United States Department of Energy and Lockheed Martin Energy Services, Inc.

BACKGROUND OF THE INVENTION

The present invention relates generally to flywheel energy storage devices. Specifically, the present invention relates to compound shells comprising either an entire flywheel rotor or the supporting structure for connecting a flywheel rim to a shaft.

DESCRIPTION OF THE PRIOR ART

The use of a flywheel as an energy storage device is well known. Flywheel technology is used in spacecraft attitude control and energy storage; land-based energy storage; vehicle-base energy storage; by hybrid momentum/energy storage wheels; and by electrical utility companies.

Clearly, the rotation of a flywheel at high speeds poses numerous hazards. For example, a flywheel spun at high rim velocities can develop fractures due to excessive loading. Numerous attempts have been made to remove the hazards during flywheel operation.

U.S. Pat. Nos. 5,452,625, 5,586,471 and 5,590,569 to Nardone et al. disclose the use of annular-shaped composite inserts positioned between composite flywheel sections. Composite flywheel sections exhibit acceptable hoop strength (strength parallel to the fiber direction) but not radial strength (perpendicular to the fiber direction). The composite annular inserts are manufactured to have a radial strength substantially greater than the composite flywheel. The annular inserts can: have a wedge shape (U.S. Pat. No. 5,452,625), have elements that interlock with associated features on the composite flywheel (U.S. Pat. No. 5,586,471) or have apertures to accommodate adhesive (U.S. Pat. No. 5,590,569). Once bonded together, the composite flywheel sections and inserts transfer shear stresses and load therebetween.

U.S. Pat. Nos. 5,566,588 and 5,628,232 to Bakholdin et al. disclose a flywheel device. A conically tapered hub connects to the flywheel. An inner cylinder connects to the shaft and to the conical hub. One embodiment discloses an inner cylinder of aluminum having radially extending slits at its outer diameter. Another embodiment (U.S. Pat. No. 5,628,232) secures a hexagonal cylinder to the shaft. The hexagonal cylinder is secured in a multi-piece cylinder having inwardly extending teeth. As the shaft rotates, the hexagonal cylinder and the multi-piece cylinder experience different radial growth. A spring on the outside of the hexagonal-cylinder bends outwardly. As a result, the multi-piece cylinder radially grows without being overstressed.

U.S. Pat. No. 5,387,451 to Miller discloses a flywheel containment device. The device uses at least one honeycomb layer. A honeycomb layer is placed radially outward of the outer diameter of the flywheel to trap dust caused by a small failure of the flywheel. The honeycomb layer can also contain larger failures of the flywheel. The honeycomb layer absorbs the energy of larger pieces of the flywheel by being crushed. The honeycomb layer is independently rotatable from the flywheel. A containment vessel is positioned radially outward of the honeycomb layer for additional protection.

Clearly, there is room for improvement in the art.

SUMMARY OF THE INVENTION

Therefore, it is an object of the present invention to provide an improved flywheel rotor or support structure for connecting a flywheel rim to a shaft.

It is a further object of the present invention to provide a flywheel rotor or a support structure having a minimum weight for specified maximum stresses.

It is a further object of the present invention to provide a compound, or multi-segmented, shell for a flywheel rotor or a support structure for connecting a flywheel rim to a shaft.

It is a further object of the present invention to provide each segment of the compound shell with an optimum shape for radial centrifugal force loading perpendicular to the shell segment axis of symmetry.

It is a further object of the present invention to provide each segment of the compound shell with an optimum shape for radial centrifugal force loading consistent with angular perpendicular to the shell segment axis of symmetry.

It is a further object of the present invention to radially slit the outermost shell segment to reduce the shell azimuthal stiffness and circumferential stress to zero thereby increasing the radial growth of the outermost shell element.

It is a further object of the present invention to provide a flywheel assembly capable of operation at higher rotational speeds.

These and other objects are achieved in one aspect of the present invention by a flywheel rim support formed from two shell halves. Each of the shell halves has a disc connected to the shaft. A first shell element connects to the disc at an interface. The interface defines a discontinuity in the meridional slope of the support. A second shell element connects to the first shell element. The second shell element has a plurality of meridional slits. A cylindrical shell element connects to the second shell element and to the inner surface of the flywheel rim.

These and other objects are achieved in another aspect of the present invention by a flywheel rim support having a disc connected to an outer diameter of a shaft. Two optimally shaped shell elements connect to the optimally shaped disc at an interface. The interface defines a discontinuity in a meridional slope of said support. A cylindrical shell element connects to the two shell elements. The cylindrical shell element has an outer surface for connecting to the inner surface of the flywheel rim.

These and other objects are achieved in another aspect of the present invention by a flywheel rim casing. An annular shell connects to the shaft. The annular shell connects to the flywheel rim. A composite shell surrounds the shaft, annular shell and flywheel rim.

BRIEF DESCRIPTION OF THE DRAWINGS

The features of the present invention will become apparent to those skilled in the art to which the present invention relates from reading the following specification with reference to the accompanying drawings in which.

DETAILED DESCRIPTION OF THE PREFERRED EMBODIMENTS

Figure 1:
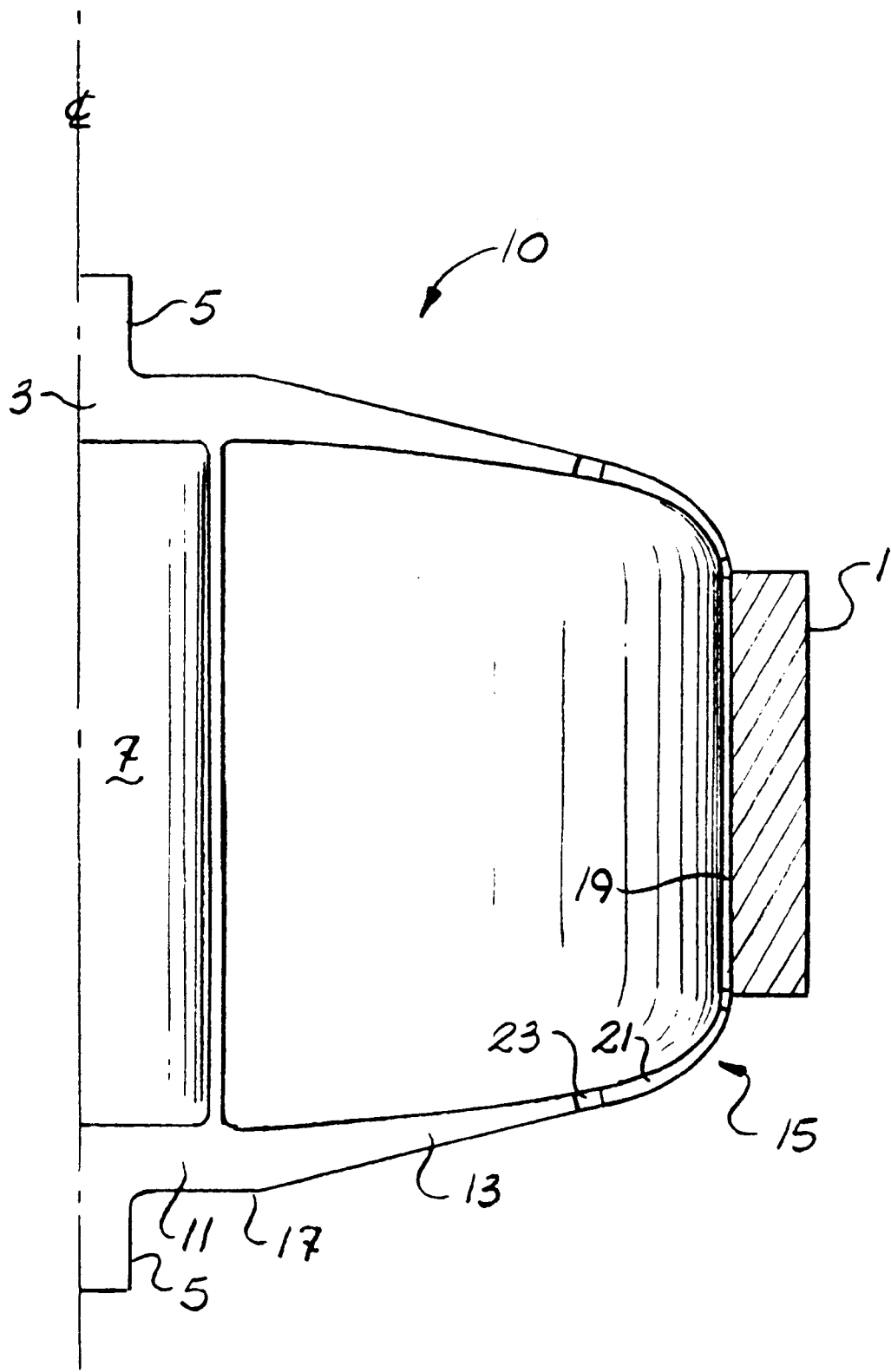
FIG. 1 is a cross-sectional view of one half of a first embodiment of the compound, or multi-segmented, shell of the present invention supporting a flywheel rim.

FIG. 1 shows a cross-sectional view of one-half of a first preferred embodiment of the present invention. A flywheel rim 1 of a flywheel assembly (not shown) is connected to a shaft 3 using a compound, or multi-segmented, shell assembly 10. Shaft 3 has a hollow interior 7 for weight reduction. Shaft 3 has bearing hubs 5 at both ends for support in bearing assemblies (not shown). Shell assembly 10 and shaft 3 support the weight of rim 1.

Shell assembly 10 is a rotationally symmetric concentrically nested assemblage of different shell elements. Each of the shell elements are generally annular in radial extent and are integrally connected at their radial boundaries. Shell assembly 10 is symmetric about an axial midplane of rim 1, forming a shell half on each side of the axial midplane of rim 1. The following description of the lower half of shell assembly 10 shown in FIG. 1 also applies to the upper half of shell assembly 10.

The innermost shell element is a flat planar disc 11. Disc 11 is integrally connected to shaft 3 and bearing hubs 5. An integral first shell element 13 extends radially outward from the outer periphery of disc 11. An integral second shell element 15 extends radially outward from the outer periphery of shell element 13. Shell element 15 is integrally connected to a cylindrical shell element 19. Cylindrical shell element 19 is shown in FIG. 1 as a thin shell since rim 1 is made from a composite. If conditions warrant use of a metal flywheel, then a thicker metal ring would be used as cylindrical shell element 19. Shell element 13 and shell element 15 are discussed in greater detail below.

Shell element 13 and shell element 15 have different optimal shapes. The shape of shell element 13 provides shell membrane stresses which are uniform and equal through shell element 13. The optimal shape of shell element 15 provides a non-uniform meridional membrane stress and zero hoop stress with shell element 15. The shapes of shell elements 13,15 are similar to a catenary curve. When shell elements 13,15 are provided with their optimal shapes, the internal stresses will be momentless (ie. will have zero bending stress). The desired shapes of shell elements 13, 15 are statically determinate solutions.

Shell element 13 extends from disc 11 at an interface 17. The thicknesses of disc 11 and shell element 13 at interface 17 are equal. However, as shown in FIG. 1, interface 17 exhibits a discontinuous meridional slope. The discontinuous meridian slope occurs as a result of the thickness of shell element 13 decreasing in a radially outward direction. In addition, the distance between shell element 13 one shell half and shell element 13 of the other shell half decreases in a radially outward direction. In other words, the axial length of shell assembly 10 decreases in a radially outward direction in the region occupied by shell element 13. Shaft 3 supports the axial thrust load produced by the discontinuity in meridian slope. The axial thrust load of each shell half is equal in magnitude but opposite in direction (i.e. the forces oppose each other). Shaft 3 transfers the axial force between the multi-segmented shells, which self-equilibrates the axial thrust load.

Shell element 13 has a unique thickness taper and slope, and curvature of the shell meridian curve. Shell element 13 is has an optimal shape for radial centrifugal force loading. The thickness of shell element 13 satisfies the following equation:

$$\frac{t}{t_o} = \text{EXP}\left[\frac{-\rho w^2}{2\sigma}(r^2 - r_o^2)\right]$$

where: t is the thickness of the shell element at any radius r;
$t_o$ is the thickness of the shell element at inner radius $r_o$;
$\rho$ is the mass density of the shell element;
w is the rotational speed (rad/sec); and
$\sigma$ is the constant value of stress;

The curvature of shell element 13 satisfies the following equation:

$$\frac{\text{Sin}\phi}{\text{Sin}\phi_o} = (r_o/r)\text{EXP}\left[\frac{\rho w^2}{2\sigma}(r^2 - r_o^2)\right]$$

where: Tan $\phi$ is the meridional slope of the shell element.

Shell element 15 extends radially outward from shell element 13. At the interface (not designated by a reference character) between shell element 13 and shell element 15, the meridional slope is continuous and the thicknesses of shell element 13 and shell element 15 are equal. Continuous meridional slope and shell thickness at the interface provides a continuous meridional stress. As a result, the internal forces between shell element 13 and shell element 15 self-equilibrates. As with shell element 13, the thickness of shell element 15 tapers in a radially outward direction and the axial length of shell assembly 10 decreases in a radially outward direction in the region occupied by shell element 15.

Shell element 15 has a unique thickness taper and slope, and curvature of the shell meridian curve. Shell element 15 is has an optimal shape for radial centrifugal force loading. The thickness of shell element 15 satisfies the following equation:

$$\frac{t}{t_o} = (r_o/r)^{m+1}\text{EXP}\left[\frac{-\rho w^2 r_o^m}{(2-m)\sigma_o}(r^{2-m} - r_o^{2-m})\right]$$

where: t is the thickness of the shell element at any radius r;
$t_o$ is the thickness of the shell element at inner radius $r_o$;
$\rho$ is the mass density of the shell element;
w is the rotational speed (rad/sec);
$\sigma_o$ is the stress at inner radius $r_o$; and
m is a positive number.

The curvature of shell element 15 satisfies the following equation:

$$\frac{\sin\phi}{\sin\phi_o} = \operatorname{Exp}\left[\frac{\rho w^2 r_o^m}{(2-m)\sigma_o}(r^{2-m} - r_o^{2-m})\right]$$

where: Tan φ is the meridional slope of the shell element.

The stress at a given radius r of shell element 15 satisfies the following equation:

$$\frac{\sigma}{\sigma_o} = (r/r_o)^m$$

Shell element 15 includes meridional slits 21 equally spaced in the shell azimuthal direction. Since FIG. 1 is a cross-section, only one slit 21 is shown in each shell half. Slits 21 penetrate the entire thickness of shell element 15. In other words, slits 21 pass entirely through shell element 15. Also, slits 21 extend the entire meridional extent of shell element 15. The slits do not extend into shell element 13 nor cylindrical shell element 19. Slits 21 divide the circumference of shell element 15 into any desired number of azimuthal segments. The actual number of slits 21 in shell element 15 is determined by the operating conditions and materials of the flywheel assembly.

Both ends of slit 21 include a drill hole 23. As with slits 21, drill holes 23 penetrate the entire thickness of shell element 15. The diameter of hole 23 is larger than the width of slit 21. Holes 23 reduce stress concentration at the ends of slit 21. The holes 23 also prevent crack initiation and propagation away from slits 21.

Shell element 15 and cylindrical shell element 19 have equal thicknesses at their interface (not designated with a reference character). The axial forces at the outer radius of shell element 15 of each shell half are equal in magnitude but opposite in direction (ie. the forces oppose each other). Accordingly, the axial force at the outer radius of shell element 15 self-equilibrates with cylindrical shell element 19.

The description of shell assembly 10 to this point is equally applicable to a metal shell assembly or a composite shell assembly. However, if shell assembly 10 is made from composite material, a thin, internal metal liner (not shown) should be provided in order to provide increased resistance to crack initiation and propagation away from slits 21. A composite shell assembly is desired, for example, during operations involving extreme rotational speeds.

Figure 2:
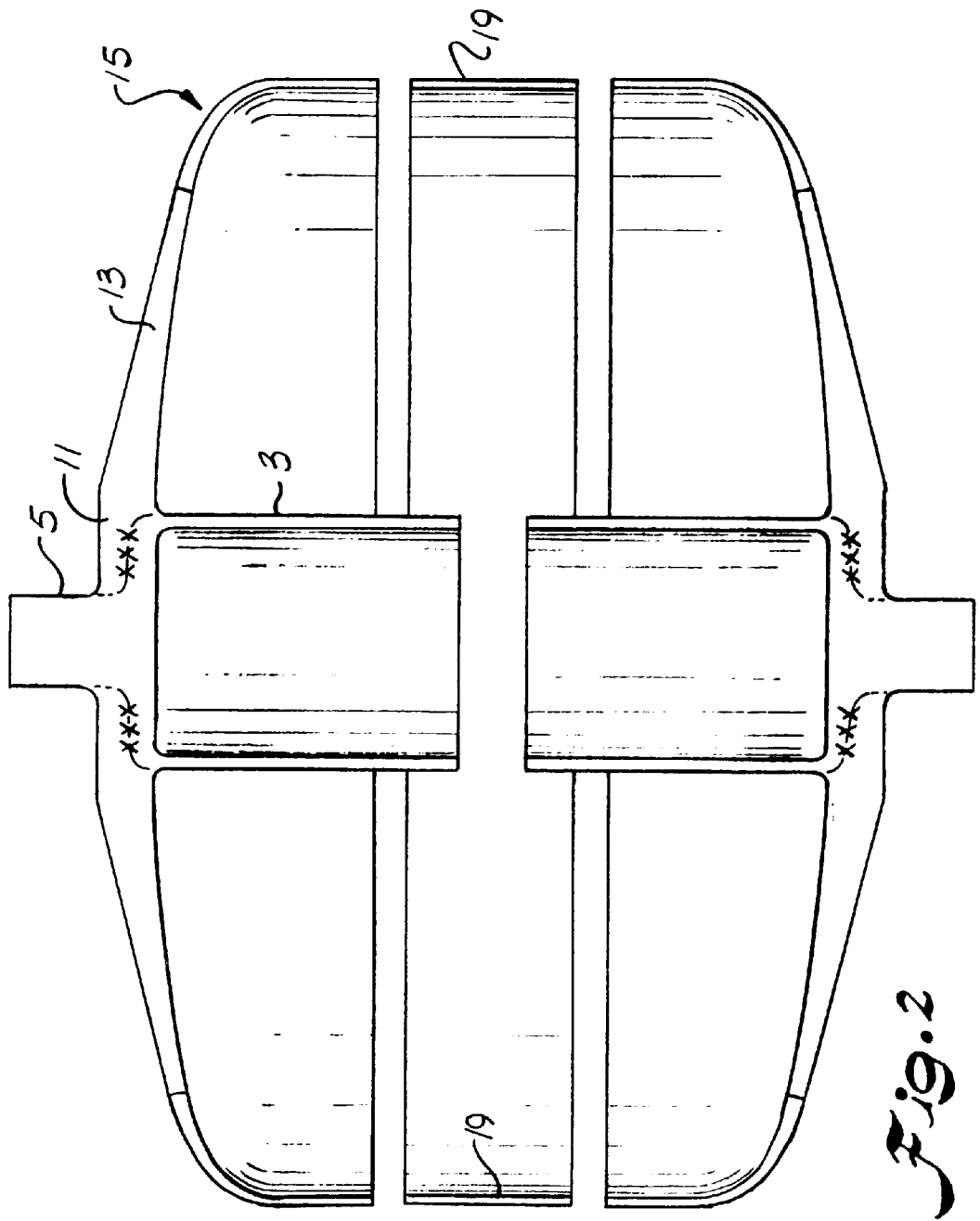
FIG. 2 is cross-sectional view of the first embodiment of the invention during assembly.

Assembly of shell assembly 10, shaft 3 and flywheel rim 1 will now be described with reference to FIG. 2. Disc 11, unslitted shell element 13, slitted shell element 15 and bearing hub 5 are fabricated as one piece. Shaft 3 is split at the axial midplane of the flywheel. A shaft half is secured to a respective one piece disc 11, unslitted shell element 13, slitted shell element 15 and bearing hub 5. FIG. 2 shows shaft 3 being connected by welding. Shaft 3 can also be connected by, for example, brazing or diffusion bonding, depending on the metal used in shell assembly 10. The two shell halves, each with attached half shaft, are brought together to position the outer periphery of each slitted shell element 15 in juxtaposition to the ends of cylindrical shell element 19. The shaft halves are either thermally shrunk or press-fit together along the axial midplane of the flywheel and are later secured by furnace brazing or diffusion bonding. Cylindrical shell element 19 is joined to the outer periphery of slitted shell element 15 by, for example, welding, brazing or diffusion bonding, depending on the metal used in shell assembly 10.

The completed shell assembly 10 is assembled onto rim 1 by thermally shrinking shell assembly 10. The joint between rim 1 and completed shell assembly 10 is additionally secured using adhesive bonding.

Applicant also contemplates other methods of assembling shell assembly 10. For instance, cylindrical shell element 19 could be split at the axial midplane of rim 1. In this scenario, each cylindrical shell element half could be integrally formed (not shown) with the one piece disc 11, unslitted shell element 13, slitted shell element 15 and bearing hub 5 described above. The cylindrical shell element halves would be press-fit together during assembly similar to the shaft halves. The cylindrical shell element halves would then be secured by welding, brazing or diffusion bonding, depending on the metal used in shell assembly 10.

Alternatively, each shaft half could be integrally formed (not shown) with the one piece disc 11, unslitted shell element 13, slitted shell element 15 and bearing hub 5 described above. The shaft halves are thermally shrunk or press fit together. The joint between the shaft halves is then secured using furnace brazing or diffusion bonding.

The operation of shell assembly 10 will now be described. Rim 1 expands radially during rotation compared to the radial extent of rim 1 during non-rotation. The centrifugal forces of rotation produce membrane stresses throughout the multi-segmented shell which cause each shell element to expand radially. The low initial bending stress of the shell elements allow radial growth matching. The radial expansion results from the meridional and azimuthal stretching of the material of each shell element. The slitting of shell element 15 allows additional circumferential expansion beyond the permissible azimuthal stretching of the material. Throughout all operating speeds, shell assembly 10 matches the radial growth of cylindrical shell element 19 and rim 1. The increased expansion of shell assembly 10 is achieved by the dual action of the circumferential expansion and meridional flexure of the azimuthal segments of slitted shell element 15. Because of slits 21, slitted shell element 15 has zero circumferential stiffness. Having zero circumferential stiffness increases the flexibility of slitted shell element 15 without exceeding the allowable hoop stress for the metal. The hoop stress is essentially reduced to zero.

The radial growth and flexural deflection of the azimuthal sections of slitted shell element 15 are limited by the cylindrical shell element 19 and the unslitted shell element 13. Slitted shell element 15 must match the radial growth of rim 1 since cylindrical shell element 19 is restrained by rim 1.

When shell assembly 10 is a composite material, the material layup provides unequal material stiffnesses in the shell meridional and azimuthal directions for the outermost shell elements. Stiffness in the meridional direction is high. Stiffness in the azimuthal direction is low. The low stiffness in the azimuthal direction allows a high radial expansion of the shell assembly 10 without exceeding allowable hoop stresses. As discussed above, a composite shell assembly also includes slits 21 in shell element 15 in order to allow greater radial growth capability. As a result of the present invention, a flywheel assembly can be operated at higher rotational speeds. In addition, less exotic materials could be used to manufacture the flywheel assembly.

Figure 3:
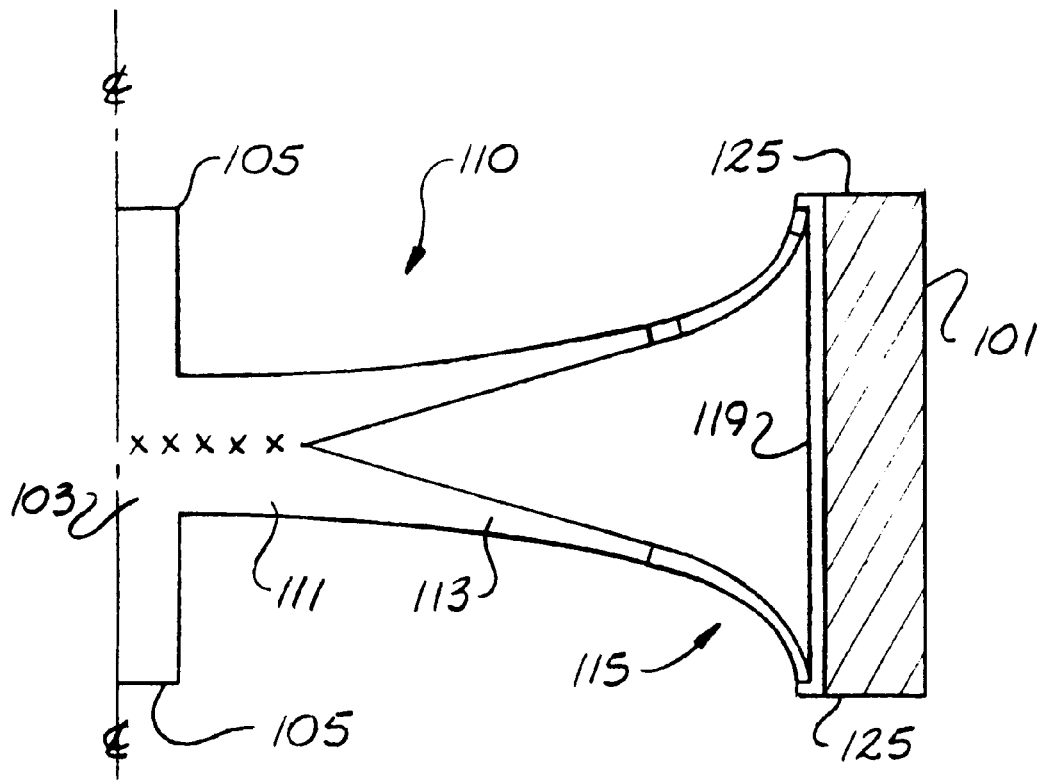
FIG. 3 is a cross-sectional view of one half of a second embodiment of the compound, or multi-segmented, shell of the present invention supporting a flywheel rim.

FIG. 3 shows a cross-sectional view of one-half of a second preferred embodiment of the present invention. This embodiment is useful when axial clearance is restricted. Thus, the second embodiment describes a low profile flywheel assembly. Features of this embodiment similar to the other embodiments use the same reference character, except for a change in the hundred digit.

A flywheel rim 101 is connected to a shaft 103 using a compound, or multi-segmented, shell assembly 110. Shaft 103 has bearing hubs 105 at both ends for support in bearing assemblies (not shown). Shell assembly 110 and shaft 103 support the weight of rim 101.

Shell assembly 110 uses the identical flat planar disc 111 and optimal shaped unslitted shell element 113 as the first embodiment. Shell assembly 110 uses a similar slitted shell element 115 as the first embodiment. Therefore, a detailed discussion of each element is unnecessary. The difference between this embodiment and the first embodiment is the orientation of the shell halves. The orientation of the shell halves is inverted and juxtaposed compared to the first embodiment. As seen in FIG. 3, the thickness of unslitted shell element 113 decreases in a radially outward direction. However, the distance between unslitted shell element 113 and slitted shell element 115 of one shell half, and unslitted shell element 113 and slitted shell element 115 of the other shell half, increases in a radially outward direction.

Slitted shell element 115 is identical to the slitted shell element of the first embodiment, save an integral, radially outwardly extending flat annular lip 125. Lips 125 from each shell half accommodate the cylindrical shell element 119 therebetween. The two shell halves are brought together to position lips 125 in juxtaposition to the ends of cylindrical shell element 119. Shell assembly 110 is inserted within the interior portion of cylindrical shell element 119 by thermally shrinking shell assembly 110. The joint between lips 125 and slitted shell element 115 is then secured using, for example, welding, brazing or diffusion bonding, depending on the metal used in shell assembly 110. The two shell halves are connected along the flat surfaces of discs 111 (along the axial midplane of rib 101) by welding. The joint could be secured also using, for example, brazing or diffusion bonding, depending on the metal used in shell assembly 110.

In the particular embodiment shown in FIG. 3, both bearing hubs 105, discs 111, unslitted shell elements 113 and slitted shell elements 115 are fabricated as two pieces. Each bearing hub 105, disc 111, unslitted shell element 113 and slitted shell element 115 at an end of rim 101 could be formed into one of the two pieces. The two pieces are welded together at their flat interface therebetween.

Figure 4:
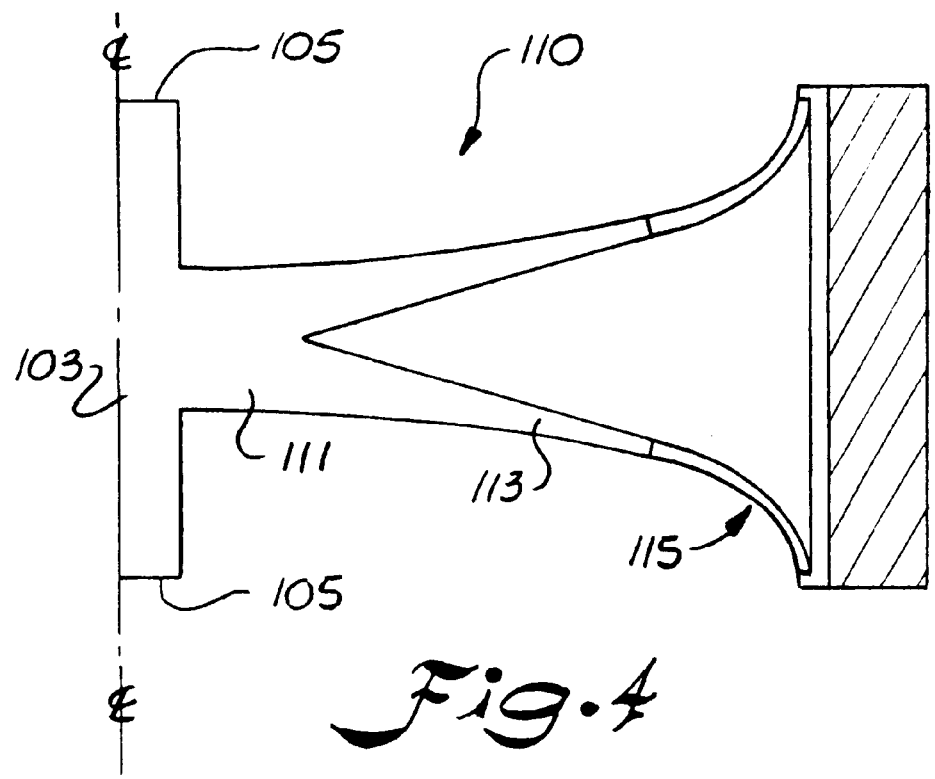
FIG. 4 is cross-sectional view of an alternative method of assembling the second embodiment of the present invention.

Applicant also contemplates other methods of assembling shell assembly 110. For instance, FIG. 4 shows that shell assembly 110 could be formed from one piece. In this instance, a flat annular ring element replaces flat annular lip 125 at each end of cylindrical shell element 119. The radial extent of the annular ring equals the combined radial extent of slitted shell element 115 and cylindrical shell element 119.

The entire shell assembly 110 and cylindrical shell element 119 is connected to rim 101 by thermally shrinking shell assembly 110 and cylindrical shell element 119. The joint between rim 101; and shell assembly 110 and cylindrical shell element 119 is additionally secured using adhesive bonding.

As a result of the present invention, including this embodiment, the flywheel assembly can be operated at higher rotational speeds. In addition, less exotic materials could be used to manufacture the flywheel assembly.

Figure 5:
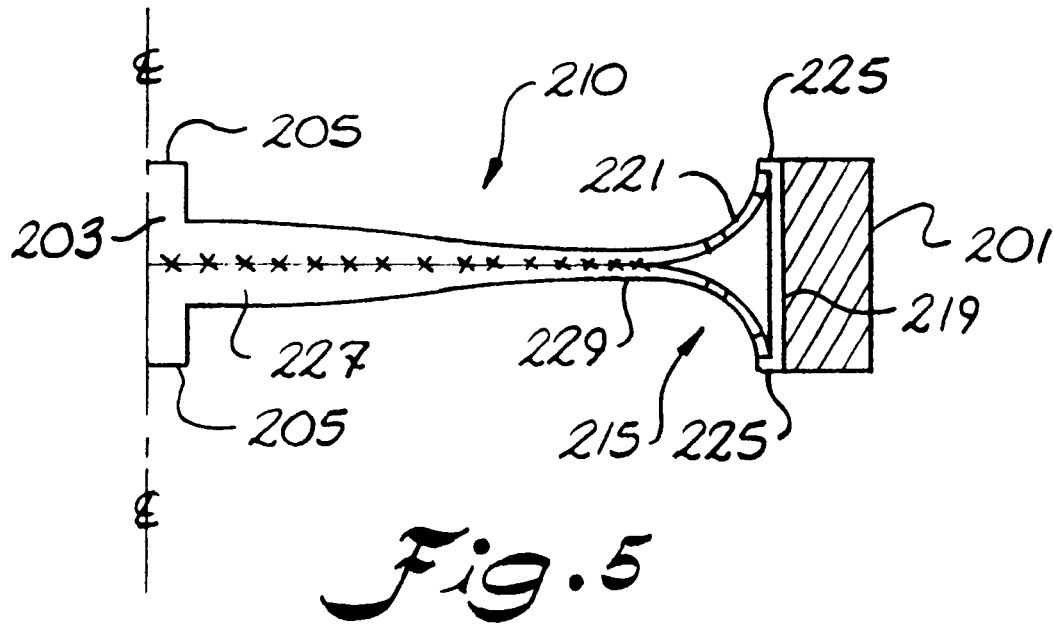
FIG. 5 is a cross-sectional view of one half of a third embodiment of the compound, or multi-segmented, shell of the present invention supporting a flywheel rim.

FIG. 5 shows a cross-sectional view of one-half of a third preferred embodiment of the present invention. Features of this embodiment similar to the other embodiments use the same reference character, except for a change in the hundred digit.

A flywheel rim 201 is connected to a shaft 203 using a compound, or multi-segmented, shell assembly 210. Shaft 203 has bearing hubs 205 at both ends for support in bearing assemblies (not shown). Shell assembly 210 and shaft 203 support the weight of rim 201.

Shell assembly 210 uses an optimum shaped disc 227 and two slitted shell elements 215 of optimal shape. Disc 227 is symmetric about the plane passing through the axial midpoint of rim 201. Disc 227 is fabricated in two halves and is integrally connected to the shaft.

The thickness taper and slope, and curvature of the shell meridian curve of disc 227 are special applications of the formulas used with the unslitted shell element of the first embodiment. Since disc 227 is not annular, the inner radius ($r_o$) is zero. Also, $\phi$ is always zero in this situation because $\phi_o$ is zero. Disc 227 is, in essence, a constant stress disc.

The two slitted shell elements 215 are connected to disc 227 at an interface 229. The slitted shell elements 215 are integrally connected to the radially outer extent of disc 227. When combined, slitted shell elements 215 have the same thickness as disc 227 at interface 229. However, the interface 229 exhibits a discontinuous meridional slope. The discontinuous meridian slope occurs as a result of slitted shell element 215 tapering in a radially outward direction differently than the taper of disc 227. As with the second embodiment, the distance between slitted shell elements 215 increases in a radially outward direction. The discontinuous meridional slope at interface 229 produces axial forces between the slitted shell elements 215 and disc 227. The axial forces self-equilibrate at interface 229 with disc 227.

Slitted shell element 215 is identical to the slitted shell element in the second embodiment. The thickness taper and slope, and curvature of the shell meridian curve of slitted shell element 215 are identical to the thickness taper and slope, and curvature of the shell meridian curve of the slitted shell element of the second embodiment.

Slitted shell element 215 includes an integral, radially outwardly extending flat annular lip 225 at each end. Lips 225 from both shell halves accommodate the radially outer extent of cylindrical shell element 219 therebetween. Shell assembly 210 is inserted within the interior portion of cylindrical shell element 219 by thermally shrinking shell assembly 210. The joint between lips 225 and slitted shell element 215 is then secured using, for example, welding, brazing or diffusion bonding, depending on the metal used in shell assembly 210. The two halves of disc 227 are joined by welding, brazing or diffusion bonding.

The entire shell assembly 210 and cylindrical shell element 219 is connected to rim 201 by thermally shrinking shell assembly 210 and cylindrical shell element 219. The joint between rim 201; and shell assembly 210 and cylindrical shell element 219 is additionally secured using adhesive bonding.

Each slitted shell element 215 produces an axial force at the interface with the cylindrical shell element 219. The axial forces from each slitted shell element are equal in magnitude, but opposite in direction (i.e. the forces are opposing). The axial force at the interface between slitted shell elements 215 and cylindrical shell element 219 is thus self equilibrated.

As discussed in the previous embodiments, rim 201 expands radially during rotation compared to the radial extent of rim 201 during non-rotation. Throughout all operating speeds, shell assembly 210 matches the radial growth of cylindrical shell element 219 and rim 201. The increase in expansion of shell assembly 210 is achieved by the dual action of the circumferential expansion and meridional flexure of the azimuthal segments of slitted shell elements 215. Because of slits 221, slitted shell element 215 has zero circumferential stiffness. Having zero circumferential stiffness increases the flexibility of slitted shell element 215 without exceeding the allowable hoop stress for the metal. The hoop stress is essentially reduced to zero.

The radial growth and flexural deflection of the azimuthal sections of slitted shell element 215 are limited by the cylindrical shell element 219 and the disc 227. Slitted shell element 215 must match the radial growth of rim 201 since cylindrical shell element 219 is restrained by rim 201.

Figure 6:
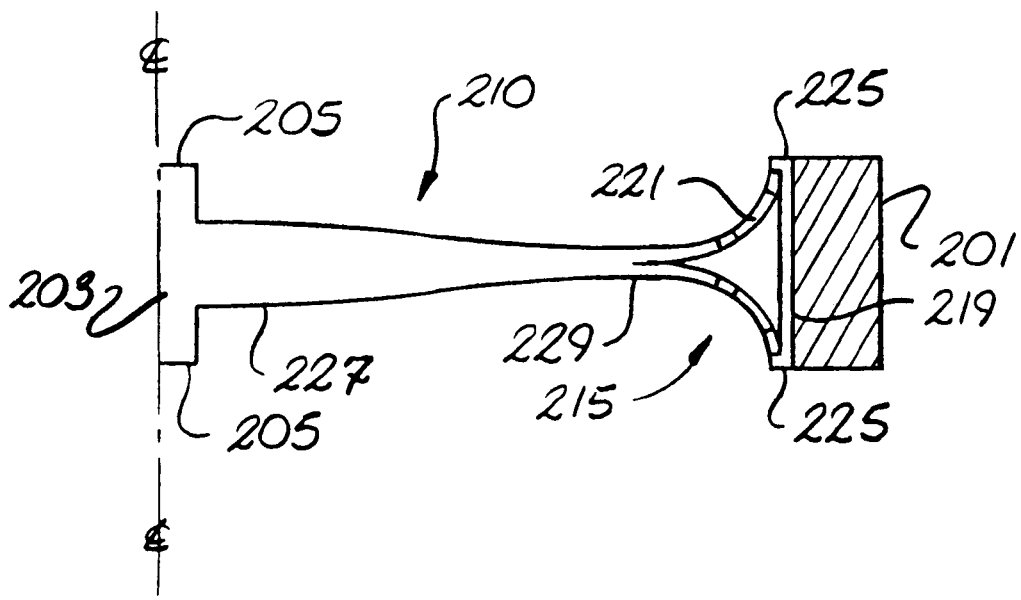
FIG. 6 is a cross-sectional view of an alternative method of assembling the third embodiment of the present invention.

Applicant contemplates other methods of assembling shell assembly 210. For instance, FIG. 6 shows that shell assembly 210 could be formed from one piece. In this instance, a flat annular ring element replaces the flat annular lip 225 at each end of cylindrical shell element 219.

As a result of the present invention, including this embodiment, the flywheel assembly can be operated at higher rotational speeds. In addition, less exotic materials could be used to manufacture the flywheel assembly.

Figure 7:
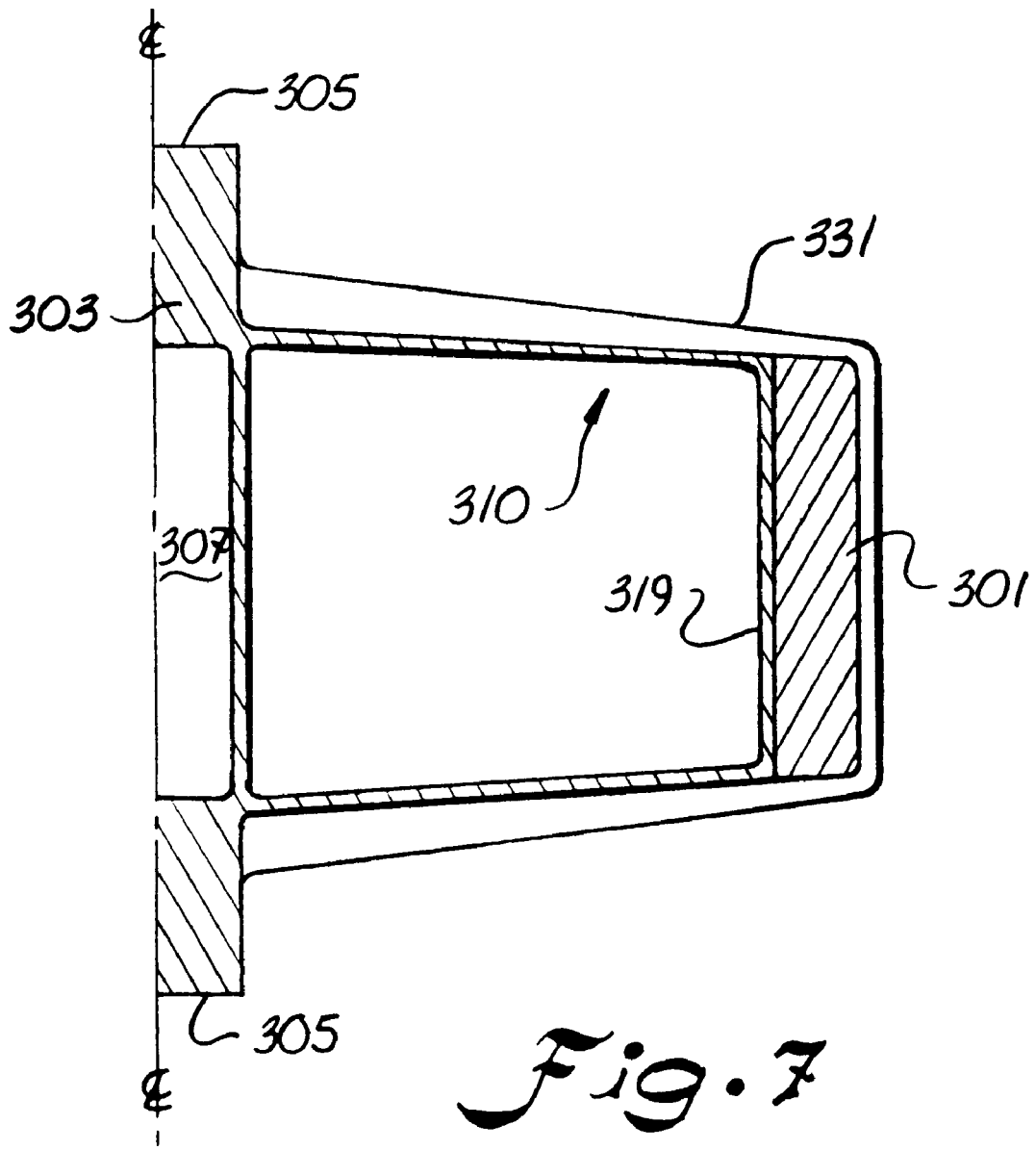
FIG. 7 is a cross-sectional view of one half of a fourth embodiment of the present invention enclosing a flywheel rim.

FIG. 7 shows a cross-sectional view of one-half of a fourth preferred embodiment of the present invention. This embodiment is utilized when, for example, significant cost savings in the production of the flywheel assembly is required. This embodiment allows the use of low strength, inexpensive composite material in the construction of the flywheel rim. This embodiment, compared to the other embodiments, provides radial restraint of the flywheel rim. The radial restraint of the rim increases the maximum speed capability of the flywheel assembly. Features of this embodiment similar to the other embodiments use the same reference character, except for a change in the hundred digit.

A flywheel rim 301 is connected to a shaft 303 using a shell assembly 310. Rim 301 can be manufactured out of low strength composite materials, for example "E" glass. Shaft 303 has a hollow interior 307 for weight reduction. Shaft 303 has bearing hubs 305 at both ends for support in bearing assemblies (not shown). Shell assembly 310 and shaft 303 support the weight of rim 301.

Shaft 303, hubs 305 and shell assembly 310 are integrally connected. The integral shaft 303, hubs 305 and shell assembly 310 are preferably manufactured from metal and are preferably lightweight. As with other embodiments, the integral shaft 303, hubs 305 and shell assembly 310 are assembled into rim 301 by thermally shrinking the integral shaft 303, hubs 305 and shell assembly 310. An adhesive joint is also utilized to additionally secure a cylindrical shell element 319 to rim 301.

An optimum shaped composite shell 331 radially restrains rim 301 and shell assembly 310 during rotation of the flywheel assembly. Composite shell 331 is formed by plies 333 and filament wound layers 339,341. Plies 333 and filament wound layers 339,341 use high strength composites, such as high strength graphite. As described in more detail below, fabrication of composite shell 331 proceeds one layer at a time. A layer includes one ply 333 and two filament wound layers 339,341.

The thickness taper and slope, and curvature of the shell meridian curve of composite shell 331 are identical to the thickness taper and slope, and curvature of the shell meridian curve of the slitted shell element of the first embodiment. The thickness and curvature of composite shell 331 is developed by the build up of layers of ply 333 and filament wound layers 339,341.

Figure 8:
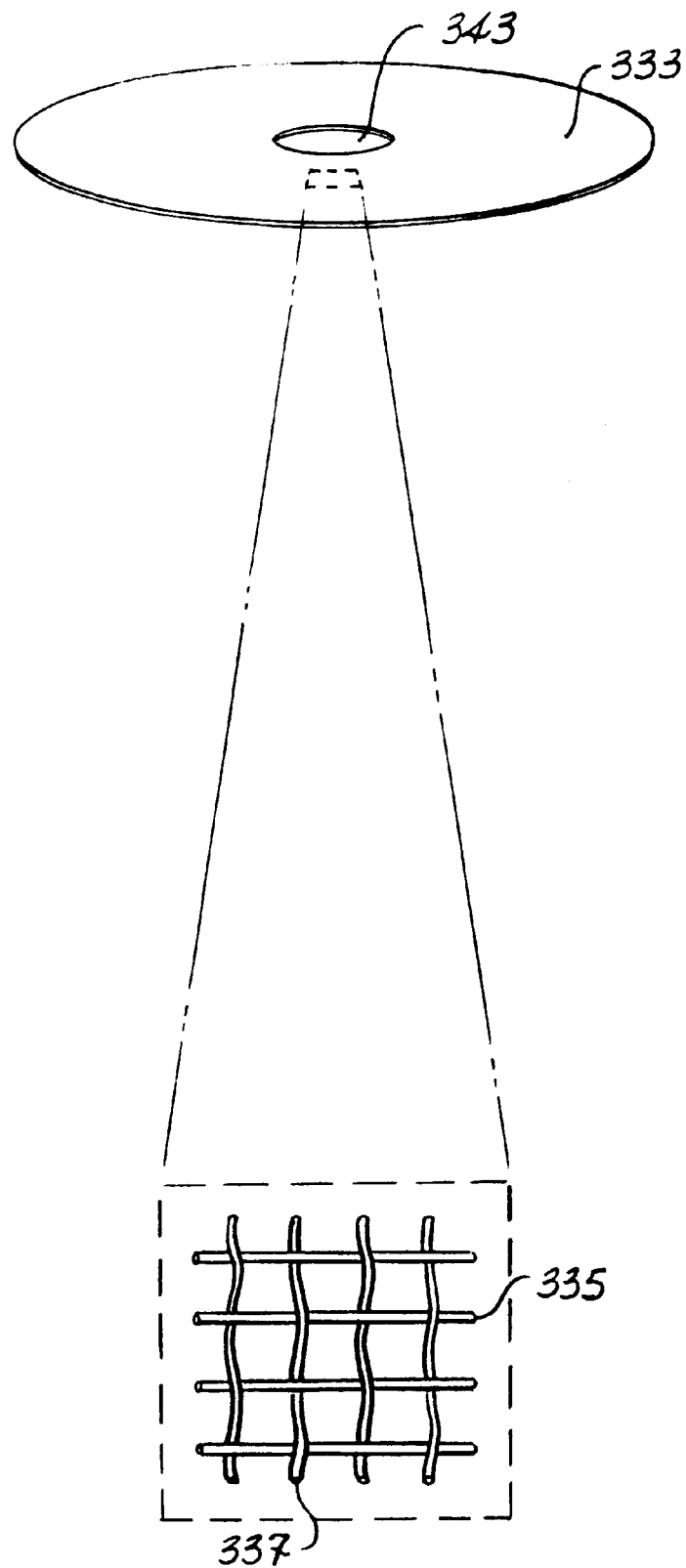
FIG. 8 is a perspective view of an annular ply forming a part of one layer of the composite shell of the fourth embodiment.

As shown in FIG. 8, each ply 333 is a circular disc having a central hole 343. Central hole 343 allows insertion of shaft 303 therethrough. Annular ply 333 is formed from one layer of woven filaments. The filaments include radial filaments 337 and azimuthal filaments 335. The ratio of radial filaments 337 and azimuthal filaments 335 is selected to provide an appropriate stiffness and strength in composite shell 331 near bearing hubs 305.

The annular plies are interspersed near each bearing hub 305 during build up of composite shell 331. Each annular ply has a preselected outer diameter in order to provide the desired ply drop sequence. The ply drop sequence produces the optimum thickness profile for composite shell 331.

Figure 9:
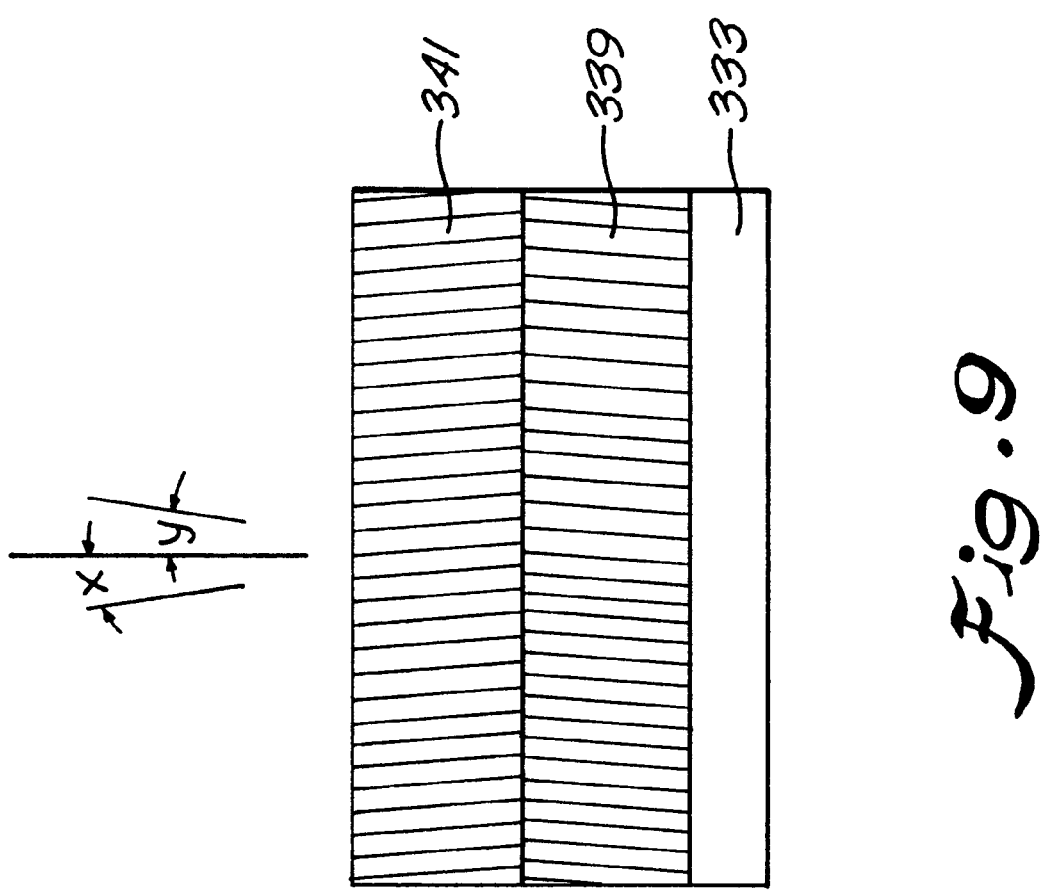
FIG. 9 is a plan view of a portion of one layer of the composite shell of the fourth embodiment.

As shown in FIG. 9, once annular ply 333 is laid down, two filament wound layers 339,341 are provided to the layer. Each filament wound layer is provided at a small angle to the shell meridian. The first filament wound layer 339 provided to the build up of composite shell 331 exhibits a "positive" small angle y to the shell meridian. The second filament wound layer 341 provided to the build up of composite shell 331 exhibits a "negative" small angle x to the shell meridian. In other words, the filament wound layers form small angles to the shell meridian, but the angles are measured in opposite directions from the shell meridian.

Central hole 343 of annular ply 333 has a slightly smaller diameter than the outer diameter of shaft 303. The inner portion of annular ply 333 forms an axial extension along the length of shaft 303. The length of the axial extension is approximately equal to the combined thickness of filament wound layers 339 and 341. Filament wound layers 339 and 341 applied after annular ply 333 captures the axial extension against the surface of shaft 331.

This completes the build up of one layer of composite shell 331. Fabrication of composite shell 331 proceeds one layer at a time. Layers are provided to composite shell 331 until the shape of composite shell 331 achieves optimum taper and curvature.

The composite shell exhibits high meridional stiffness. In fact, the stiffness and strength of composite shell 331 in the meridional direction is higher than in the azimuthal direction. The high meridional stiffness restrains the radial growth of rim 301. The principal stiffnesses and strengths of the innermost layers of composite shell 331 are controlled by the alternating annular and filament wound plies. The principal stiffnesses of the outermost layers of composite shell 331 are controlled by the angled filament wound plies.

As a result of the present invention, including this embodiment, the flywheel assembly can be operated at higher rotational speeds. In addition, less exotic materials could be used to manufacture the flywheel assembly.

It is also understood that many other variations are apparent to one of ordinary skill in the art from a reading of the above specification. Such variations are within the spirit and scope of the instant invention as defined by the following appended claims.

I claim:

1. A support for connecting a flywheel rim to a shaft, comprising:
   (a) two shell halves, each shell half comprising:
       a disc without perforation having a radially outer extent, said disc connectable to said shaft along the extent of the interface between the end of said shaft and the surface of said disc;
       a first shell element connected at a radially inner extent to said radially outer extent of said disc at an interface, said interface defining a discontinuity in a meridional slope of said support; and
       a second shell element connected at a radially inner extent to a radially outer extent of said first shell element, said second shell element having a plurality of meridional slits;
   (b) a cylindrical shell element connected to a radially outer extent of said second element, said cylindrical shell element having an outer surface adapted for connection to an inner surface of said flywheel rim;

(c) said first shell element has an optimal shape that provides shell membrane stresses that are uniform and equal through said first shell element, and said second shell element has an optimal shape that provides a non-uniform meridional membrane stress and zero hoop stress through said second shell element said optimum shape of each of said shell elements provides shell bending stresses that are zero through each of said shell elements; and said optimal shape of said first shell element and said optimal shape of said second shell element each having a thickness taper;

said optimal shape of said first shell element and said optimal shape of said second shell element each having a curvature and slope;

said thickness taper of said first shell element determined by satisfying the equation:

$$\frac{t}{t_o} = \text{EXP}\left[\frac{-\rho w^2}{2\sigma}(r^2 - r_o^2)\right]$$

wherein:

t is the thickness of said respective shell element at any radius r;

$t_o$ is the thickness of said respective shell element at inner radius $r_o$;

$\rho$ is the mass density of said shell element;

w is the rotational speed (rad/sec); and $\sigma$ is the constant value of stress; and said curvature and slope of said first shell element determined by satisfying the equation:

$$\frac{\text{Sin}\phi}{\text{Sin}\phi_o} = (r_o/r)\text{EXP}\left[\frac{\rho w^2}{2\sigma}(r^2 - r_o^2)\right]$$

wherein:

Tan $\phi$ is the meridional slope of said respective shell element;

and said thickness taper of said second shell element determined by satisfying the equation:

$$\frac{t}{t_o} = (r_o/r)^{m+1}\text{EXP}\left[\frac{-\rho w^2 r_o^m}{(2-m)\sigma_o}(r^{2-m} - r_o^{2-m})\right]$$

wherein:

t is the thickness of said shell element at any radius r;

$t_o$ is the thickness of said shell element at inner radius $r_o$;

$\rho$ is the mass density of said shell element;

w is the rotational speed (rad/sec);

$\sigma_o$ is the stress at inner radius $r_o$; and m is a positive number; and said curvature and slope of said second shell element determined by satisfying the equation:

$$\frac{\text{Sin}\phi}{\text{Sin}\phi_o} = \text{Exp}\left[\frac{\rho w^2 r_o^m}{(2-m)\sigma_o}(r^{2-m} - r_o^{2-m})\right]$$

wherein:

Tan $\phi$ is the meridional slope of said respective shell element;

said non-uniform meridional membrane stress determined by satisfying the equation:

$$\frac{\sigma}{\sigma_o} = (r/r_o)^m$$

wherein:

r is any radius of said respective shell element.

2. The support for connecting a flywheel rim to a shaft as recited in claim 1, wherein said first shell element and said second shell element are annular.

3. The support for connecting a flywheel rim to a shaft as recited in claim 1, further comprising a shaft bearing hub connected to each of said shell halves.

4. The support for connecting a flywheel rim to a shaft as recited in claim 1, further comprising a shaft, said shaft being separable into shaft halves, each of said shaft halves connected to a respective shell half.

5. The support for connecting a flywheel rim to a shaft as recited in claim 1, each of said plurality of slits having ends, one of said ends located at said radially inner extent of said second shell element and the other of said ends located at said radially outer extent of said second shell element.

6. The support for connecting a flywheel rim to a shaft as recited in claim 5, each of said plurality of slits having a width, said width at said ends being larger than said width between said ends.

7. The support for connecting a flywheel rim to a shaft as recited in claim 1, said disc having a thickness at said interface equal to a thickness of said first shell element at said interface.

8. The support for connecting a flywheel rim to a shaft as recited in claim 1, said support having an axial length decreasing in a radially outward direction.

9. The support for connecting a flywheel rim to a shaft as recited in claim 1, said support having an axial length increasing in a radially outward direction.

10. A support for connecting a flywheel rim to a shaft, comprising:

a disc without perforation having a radially outer extent, said disc connectable to said shaft along the extent of the interface between the end of said shaft and the surface of said disc;

two shell elements connected at a radially inner extent to said radially outer extent of said disc at an interface, said interface defining a discontinuity in a meridional slope of said support; a first of said two shell elements has an optimal shape that provides shell membrane stresses that are uniform and equal through said first of said two shell elements and a second of said two shell elements has an optimal shape that provides a non-uniform meridional membrane stress and zero hoop stress through said second of said two shell elements, said optimum shape of each of said shell elements provides shell bending stresses that are zero through each of said shell elements; and a cylindrical shell element connected to a radially outer extent of said two shell elements, said cylindrical shell element having an outer surface adapted for connection to an inner surface of said flywheel rim;

said optimal shape of said disc and said first shell element and said second shell element each having a thickness taper;

said optimal shape of said disc and said first shell element and said second shell element having a curvature and slope;

said thickness taper of said disc and of said first shell element determined by satisfying the equation:

$$\frac{t}{t_o} = \text{EXP}\left[\frac{-\rho w^2}{2\sigma}(r^2 - r_o^2)\right]$$

wherein:
t is the thickness of said respective shell element at any radius r;
$t_o$ is the thickness of said respective shell element at inner radius $r_o$;
ρ is the mass density of said shell element;
w is the rotational speed (rad/sec);
σ is the constant value of stress; and
said curvature and slope of said disc are each zero; and
said curvature and slope of said first shell element determined by satisfying the equation:

$$\frac{\text{Sin}\phi}{\text{Sin}\phi_o} = (r_o/r)\text{EXP}\left[\frac{\rho w^2}{2\sigma}(r^2 - r_o^2)\right]$$

wherein:
Tan φ is the meridional slope of said respective shell element;
and said thickness taper of said second shell element determined by satisfying the equation:

$$\frac{t}{t_o} = (r_o/r)^{m+1}\text{EXP}\left[\frac{-\rho w^2 r_o^m}{(2-m)\sigma_o}(r^{2-m} - r_o^{2-m})\right]$$

wherein:

t is the thickness of said shell element at any radius r;
$t_o$ is the thickness of said shell element at inner radius $r_o$;
ρ is the mass density of said shell element;
w is the rotational speed (rad/sec);
$\sigma_o$ is the stress at inner radius $r_o$; and
m is a positive number; and
said curvature and slope of said second shell element determined by satisfying the equation:

$$\frac{\text{Sin}\phi}{\text{Sin}\phi_o} = \text{Exp}\left[\frac{\rho w^2 r_o^m}{(2-m)\sigma_o}(r^{2-m} - r_o^{2-m})\right]$$

wherein:
Tan φ is the meridional slope of said respective shell element;
said non-uniform meridional stress determined by satisfying the equation:

$$\frac{\sigma}{\sigma_o} = (r/r_o)^m$$

wherein:
r is any radius of said respective shell element.

11. The support for connecting a flywheel rim to a shaft as recited in claim 10, wherein said two shell elements are annular.

* * * * *